Feb. 16, 1965   H. A. FRENCH   3,169,523
EAR PROTECTOR
Filed Feb. 23, 1962
FIG_1
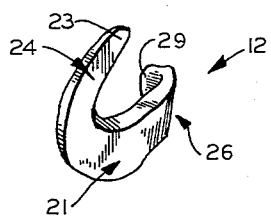
FIG_2
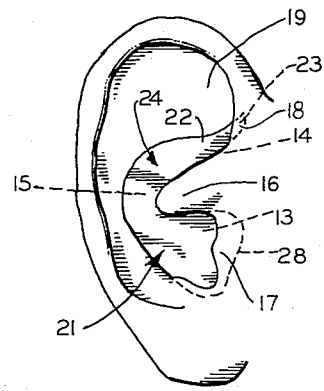
FIG_3
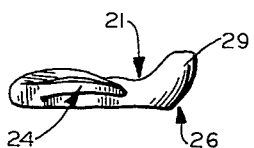
FIG_4
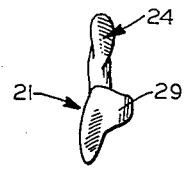
INVENTOR.
HARRY A. FRENCH
BY *Lothrup & West*
ATTORNEYS

United States Patent Office

3,169,523
Patented Feb. 16, 1965

3,169,523
EAR PROTECTOR
Harry A. French, 2348 Cortez Lane, Sacramento, Calif.
Filed Feb. 23, 1962, Ser. No. 174,938
3 Claims. (Cl. 128—152)

The invention relates to devices inserted partially into the human ear to protect the ear against the intrusion of unwanted sounds and noises and against the entry of undesired matter such as water, dust and grit.

Heretofore, so far as is known, all varieties of ear plugs have been held in place in the ear canal by the frictional force of resilient members pressing tightly outwardly against the ear canal walls. The canal walls of the human ear are extremely sensitive, and even in a fairly short time the pressure exerted by these plugs creates pain. Consequently, many people who should be wearing ear protectors, for their own good, refuse to do so.

It is therefore an object of the invention to provide an ear protector which is comfortable to wear even for very long periods of time.

It is another object of the invention to provide an ear protector which is extremely effective to mute loud noises and sounds and to prevent the entry of extraneous undesired matter.

It is a further object of the invention to provide an ear protector which substantially attenuates loud noises, yet which allows to pass a substantial fraction of sounds having the volumes and frequencies of the human voice, thus enabling commands and warnings to be heard and permitting the carrying on of conversations without the necessity of removing the protectors.

It is yet another object of the invention to provide an ear protector which, while individually molded and sculptured to fit the ears of the particular user is nevertheless, relatively inexpensive.

It is still a further object of the invention to provide an ear protector which, owing to its unique arrangement of retention members, is quickly insertable and removable, yet which is retained in the ear during use in a very secure fashion.

It is another object of the invention to provide a generally improved ear protector.

Other objects, together with the foregoing, are attained in the embodiment described in the following description and shown in the accompanying drawing in which:

FIGURE 1 is a perspective view of one form of the device, for the right ear;

FIGURE 2 is a side elevation showing the device installed and indicating, in outline, two of the retention zones;

FIGURE 3 is a top plan view of the device shown in FIGURE 1; and

FIGURE 4 is a front elevational view thereof.

While the ear protector is susceptible of numerous physical embodiments depending upon the particular configurations of the user's ears, the herein shown and described embodiment represents an "average" configuration of the device.

The ear protector of the invention, generally designated by the reference numeral 12, is individually formed and sculptured to fit the user's ears with great precision. The consequence of this accuracy is that the fit is a snug one but does not distort the portions of the auricle, or external ear, with which the device comes into contact.

The first step in producing the item is to take a separate impression of both ears, it having been found that a person's left ear differs, often markedly, from the right ear. To take the impression, a plastic material such as "Audalin," of the consistency of soft putty, is carefully and firmly packed first into the outer portion, or zone, or mouth of the ear canal to a depth of the order of one-quarter to three-eighths of an inch, and next into the bowl portion of the ear. The bowl portion of the ear includes the cavum conchae, an area generally designated by the numeral 13, the cymba conchae 14 and the intermediate portion 15 curving around the posterior base portion of the crus helicis 16. The material is also packed underneath the tragus 17, underneath the anterior portion 18 of the crus helicis 16, and adjacent the anterior portion of the crura antihelicis 19.

After the material is packed into the zones described it is allowed to remain in position while a stiffening chemical reaction occurs. During this short period of less than five minutes the resiliency of the auricle members tends to overcome the slight distortion caused by the packing and to mold or form the material into the exact conformation of the ear members as they are under normal conditions.

After stiffening has taken place, the material becomes a firm, rubber-like mass, shaped to exact conformity with the ear elements.

This mass is thereupon removed from the ear and forms, in effect, a male mold. This male mold serves to form a counterpart, female mold. The male mold is invested in an algaenate or other suitable mold compound that will provide a smooth flexible-type mold, and one that is tough enough to contain and chemically reject the material used to form the ear protector.

Having formed the female mold, the ear protector, in rough form, can be cast. Casting is effected by packing into the female mold two separate and distinctive types of materials, two types of acrylic plastics having been found to be eminently suitable.

The portion of the female mold corresponding to the ear canal is filled with a material which is soft and yielding and has a tendency to adhere slightly to flesh. One such material is commercially known as "Audiflex."

The balance of the mold is filled with a hard, glasslike acrylic of the kind commonly used in dentures. This hard acrylic material bonds extremely well with the softer, somewhat resilient ear canal portion.

Thereafter, the casting is cured by suitable heat and pressure, as in an autoclave, and removed from the mold for the next step, viz., that of sculpturing and polishing the casting so that it will fit the user's ears with great precision.

Sculpturing is effected for the purpose of removing nonfunctional portions of the casting, if any, and of forming precisely and to a smooth finish, those portions of the casting which, as a completed ear protector, will be held in snug position by the various retention members.

It is again to be emphasized that the ear protector of the invention is not anchored in place by fritcion plugs which pry the ear canal apart or which distort other fleshy elements of the auricle to achieve a holding effort. Instead, the device is held securely in position by various retention points, or retention members, the choice of which is related to the geometrical configuration of certain, predetermined cavities, projections and curvatures of the auricle.

Referring to drawing, it will be seen that for an "average" right ear, the protector is generally C-shaped. The lower portion 21 of the C is greater in size than the upper portion 22. Thus, for convenience of terminology, the lower portion 21 is designated as a main body portion, and also is assigned reference numeral 21.

The lower, or main body portion 21 is constructed of the hard, glassy material referred to above. In general, the hard, main body portion 21 covers or fills the cavum conchae 13 in snug relation.

Extending upwardly to cover and engage snugly the generally planar zone 15 adjacent the posterior end of the crus helicis 16, and forwardly over the cymba conchae 14 so as to underlie at its tip 23, the anterior portion 18 of the crus helicis 16, is a retention arm, generally designated by the numeral 24. The retention arm 24, being part of the main body 21, is also of hard non-resilient material.

Fused with the main body at its anterior, or forward, end is a second member, generally designated by the numeral 26, the second member being of the softer, more resilient material. The second member 26 not only projects forwardly so as to underlie, as at 28, the tragus 17, but it also extends inwardly to form a projection 29, or knob, which fills, in snug relation, the entrance, or mouth, portion of the ear canal.

In addition to the snug fits which everywhere obtain, there is a plurality of specific retention zones which serve, in cooperation with the geometry of the various ear elements, to lodge the ear protector securely in place.

The large generally planar cymba conchae 14, cavum conchae 13 and intermediate area 15 provide a substantial co-planar surface which tends to prevent tilting of the device.

Furthermore, when abnormal air pressure or water pressure is exerted against the ear protector, which is generally plannar, the inward force is spread over a substantial area, thus reducing the unit force exerted on any particular area. This minimizes the likelihood that any area of the ear will be subjected to painful stress.

Outward movement, as well as forward, rearward, upward and downward movement, of the protector is resisted by the retention zone 18, together with the retention zone 28 (underlying the tragus 17) and the snug fit of the soft resilient projection 29 into the ear canal.

On exposure to the body heat existing in the ear canal, the resilient portion 29 becomes even more flexible, thus allowing comfortable jaw movement during eating, speaking, etc. without pushing uncomfortably against the ear canal walls. The flexible portion, furthermore, tends to cling to the adjacent skin and thus forms a very effective seal.

The weight of the device is relatively insignificant and the fit is so meticulous as to avoid any stretching or distortion of the ear. Consequently, in ordinary use, the device is not felt or sensed in any manner.

Yet, owing to its ability to spread above-atmospheric pressures, be they sudden as in an explosion, or resulting from high continuous sound levels, as in a boiler factory or near jet aircraft activity, sounds of high intensities and frequencies are attenuated to a substantial degree. Tests have shown that with frequencies up to 2,000 cycles per second the attenuation will average 20 decibels; with frequencies above 2,000 c.p.s. attenuation of up to 30 decibels, or even more for highest audible frequencies, has been observed.

Consequently, vocal warnings and normal conversations are not blocked out. Yet, extraordinarily loud and hearing-damaging sounds are attenuated to a relatively harmless level. Concurrently, this desirable result is effected by an easily insertable and removable device which can be worn comfortably for extended periods of time.

What is claimed is:

1. An ear protector comprising an imperforate generally C-shaped auricle insert individually molded to the ear of the wearer, said C-shaped insert including a first portion of substantially rigid plastic material, and a second portion projecting laterally from one end of said C-shaped insert, said second portion being a solid body of relatively resilient plastic material integrally fused to said first portion and soft and flexible at body temperature.

2. An ear protector comprising individually molded and sculptured auricle insert individually molded to the ear of the wearer having a first, inner solid body portion of relatively resilient plastic material adapted to extend into and substantially completely block the ear canal and being soft and flexible at body temperature, and a second, outer portion of substantially rigid plastic material fusing into said relatively resilient material and being shaped to engage only relatively immobile hard cartilage in the bowl of the pinna.

3. The device of claim 2 wherein said material of said first portion smoothly merges into said material of said second portion, and, forms a continuously molded and sculptured configuration therewith.

References Cited by the Examiner

UNITED STATES PATENTS

| | | | |
|---|---|---|---|
| 1,355,276 | 10/20 | Schultz | 128—152 |
| 2,910,980 | 11/59 | Stewart | 128—152 |
| 3,047,089 | 7/62 | Zwislocki | 128—151 |

FOREIGN PATENTS

| | | |
|---|---|---|
| 63,184 | 7/92 | Germany. |
| 8,960 | 1913 | Great Britain. |

OTHER REFERENCES

Acrylics And Other Dental Resins, Tylman and Peyton, J. B. Lippincott Co., 1946, page 427.

The Bulletin of the Dow Corning Center for Aid to Medical Research, vol. 2, April 1960, page 8, "Ear Protector of Silastic RTV."

RICHARD A. GAUDET, *Primary Examiner.*

RICHARD J. HOFFMAN, JORDAN FRANKLIN, *Examiners.*